Patented Oct. 21, 1941

2,260,005

UNITED STATES PATENT OFFICE 2,260,005

INTERPOLYMERIZATION PRODUCT OF ALLYL CROTONATE AND UNSATURATED ALKYD RESIN

Gaetano F. D'Alelio, Pittsfield, Mass., assignor to General Electric Company, a corporation of New York No Drawing. Application January 20, 1940, Serial No. 314,847

12 Claims. (Cl. 260—42)

This invention relates to the production of new materials having valuable and characteristic properties that make them especially suitable for use in industry, for example in molding, laminating, casting, coating and adhesive applications, and for other purposes. The invention is concerned more particularly with compositions of matter comprising an interpolymer (copolymer) or interpolymers of at least one modified or unmodified polyhydric alcohol ester of an alpha unsaturated alpha beta polycarboxylic acid (hereafter for brevity designated generally as an "unsaturated alkyd resin") and at least one ester of crotonic acid, e. g., ethyl crotonate, butyl crotonate, allyl crotonate, glyceryl crotonate, etc.

The monohydric and polyhydric alcohol esters of crotonic acid are, in themselves, relatively inactive polymerizing bodies. If polymerization does occur, the polymers usually are of a low molecular weight, fluid nature and are of limited commercial value. For example, samples of ethyl, butyl, glycol, glyceryl and allyl crotonates having incorporated therein from 0.5 to 1.0% benzoyl peroxide showed no visual evidence of appreciable polymerization when heated for from 2 to 120 hours at about 80° C. On the other hand, the unsaturated alkyd resins alone are unsuited, even in the presence of polymerization catalysts such as peroxides, for the preparation of practically useful massive bodies. With or without peroxides or other polymerization catalysts, however, they may be applied in film form and, under the influence of heat or light, or heat and light, may be converted in a reasonable time to a cured film. But if effort be made to prepare commercially useful massive bodies from the unsaturated alkyds alone, heat treatment even for 24 hours in the presence of a polymerization catalyst such as a super-peroxide usually gives unsuitable materials, that is, they generally lack the properties required for the usual service applications. For instance, the cast or molded articles often are soft, rubbery masses (even after heat treatment for 24 hours at elevated temperatures) or, if hard bodies, frequently are filled with bubbles or show cracks, or both, when cured.

It was therefore quite surprising and unexpected to find that by copolymerizing an ester (aliphatic or carbocyclic) of crotonic acid with an unsaturated alkyd resin, interpolymers were obtained having properties quite different from the properties of the individual components when polymerized under the same conditions. The properties of the interpolymers range, for example, from hard, tough, insoluble and infusible bodies both in film form and when cast or molded in large size to softer, flexible bodies or rubbery masses. In general, the properties of these new products are such as to render them suitable for a wide variety of technical applications.

Compositions produced in accordance with this invention also are particularly well adapted for use as "solventless varnishes," for instance as coating compositions and binders in the production of laminated sheets and tapes for use in insulating electrical devices, as well as for other applications.

Another practical advantage accruing from my invention is that the esters of crotonic acid are good dispersion mediums for polymerization catalysts such as super-peroxides, which catalysts are dissolved or dispersed in the unsaturated alkyd resins alone only with great difficulty.

In carrying the present invention into effect a polymerizable esterification product of a polyhydric alcohol and an alpha unsaturated alpha beta polycarboxylic acid is first prepared in accordance with technique now well known to those skilled in the alkyd resin art. Any polyhydric alcohol containing at least two esterifiable hydroxyl groups, or mixtures of such alcohols, may be used in preparing the unsaturated alkyd resin. Examples of such polyhydric alcohols are ethylene glycol, di-, tri- and tetra-ethylene glycols, propylene glycol, trimethylene glycol, thiodiglycol, glycerine, pentaerythritol, etc. Examples of such polycarboxylic acids are maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc. If available, anhydrides of these polycarboxylic acids may be employed.

The terms "polycarboxylic acid" and "dicarboxylic acid," as used generally herein and in the appended claims with reference to non-ethylenic polycarboxylic acids and alpha unsaturated alpha beta polycarboxylic acids, are intended to include within their meaning the anhydrides of such acids.

In some cases, instead of using an unmodified unsaturated alkyd resin I may use a polymerizable unsaturated alkyd resin which has been internally modified by replacing a part, say up to about 75 mol per cent, of the unsaturated polycarboxylic acid with a non-ethylenic polycarboxylic acid, for example a saturated aliphatic polycarboxylic acid such as succinic, adipic, glutaric, pimelic, sebacic, azelaic, suberic, tricarballylic, etc., an aromatic palycarboxylic acid, e. g., phthalic, benzoyl phthalic, terephthalic, etc.

The term "unsaturated alkyd resin" as used generally herein and in the appended claims is intended to include within its meaning both unmodified esterification products of a polyhydric alcohol with an alpha unsaturated alpha beta polycarboxylic acid and polymerizable esterification products of the said components which have been modified, for example, as above briefly described.

In producing these new interpolymerization products any ester of a crotonic acid may be employed, although for many applications the use of an unsaturated alcohol ester of a crotonic acid has definite advantages over the saturated alcohol esters. Depending upon the particular properties desired in the interpolymer, the ester radical of the crotonic ester may be, for instance, any aliphatic or carbocyclic radical, more specific examples of which are methyl, ethyl, propyl, isopropyl, butyl, secondary butyl, isobutyl, amyl, hexyl, octyl, decyl, octadecyl, allyl, methallyl, crotyl, propargyl, 1-chlorallyl, 2-chlorallyl, cinnamyl, 3-methyl allyl, vinyl methvinyl, phenyl allyl, 1-phenyl-2-propyn-1-yl, 3-methyl-4-nonyn-3-yl, 4-methyl-5-decyn-4-yl, 4-methyl-5-undecyn-4-yl, phenyl, halo-phenyl, halo-cresyl, xylyl, tolyl, naphthyl, phenoxy ethyl, phenyl ethyl, phenyl propyl, cyclohexyl, ortho methyl cyclohexyl, furfuryl, etc. Additional examples of the crotonic ester radical are the radicals of the saturated and unsaturated alcohols and other esterifiable hydroxy compounds disclosed in my copending application Serial No. 313,103, filed January 9, 1940, and assigned to the same assignee as the present invention.

To achieve copolymerization of the unsaturated alkyd resin with the ester of crotonic acid, a solution of the said resin in the said ester first preferably is effected. The crotonic ester also advantageously may act as the carrier for a small amount of a polymerization catalyst. Examples of polymerization catalysts which may be used are ozone, ozonides, inorganic super-oxides such as barium peroxide, sodium peroxide, etc., aliphatic acyl peroxides, e. g., acetyl peroxide, lauryl peroxide, stearyl peroxide, etc., peroxides of the aromatic and the aliphatic-aromatic acid series, e. g., benzoyl peroxide, acetyl benzoyl peroxide, various percompounds such as perborates, persulfates, perchlorates, etc., aluminum salts such as the halides, e. g., aluminum chloride, organic and inorganic acids such as methacrylic acid, hydrofluoric acid, etc., metal compounds of the unsaturated acids such, for instance, as cobalt and manganese resinates, linoleates, maleates, etc. Benzoyl peroxide is the preferred catalyst. Any suitable amount of catalyst may be used, but in general the catalyst concentration will be within the range of 0.1 to 2.0 per cent by weight of the whole.

When rapidity of interpolymerization between the unsaturated alkyd resin and the ester of crotonic acid is of secondary importance, copoylmerization between these components may be effected merely under the influence of heat, light, or heat and light and in the absence of an accelerator of polymerization. The rate of copolymerization and the properties of the final product vary with the time, temperature and, if a catalyst is used, also with the catalyst concentration. Copolymerization may be effected at from room temperature (20° to 30° C.) to temperatures above 100° C., for example about 130° C., but ordinarily I use temperatures within the range of 60° to 120° C. in causing the mixed components to interpolymerize.

In order that those skilled in the art better may understand how the present invention may be carried into effect, the following examples are given by way of illustration. All parts are by weight.

EXAMPLE 1

Preparation of esters of crotonic acid

Glyceryl crotonate was prepared by direct esterification of crotonic acid with glycerine in the presence of sulfuric acid as an esterification catalyst and benzene as a diluent, the proportions of components being as follows:

| | Parts |
|---|---|
| Glycerine | 53.5 |
| Crotonic acid | 200.0 |
| Benzene | 53.5 |
| Sulfuric acid (95.5%) | 6.0 |

The reaction was carried out in a continuous water-removal esterification apparatus until no more water of esterification was given off. The sulfuric acid was neutralized with an aqueous sodium carbonate solution. The crude ester was dried over anhydrous sodium carbonate and then distilled, yielding a fraction of glyceryl crotonate boiling at 174°–176° C. at 2 mm. pressure.

In a similar manner other esters of crotonic acid were prepared, for example:

| | Boiling range |
|---|---|
| Ethyl crotonate | 134° to 139° C. at 748.9 mm. |
| Butyl crotonate | 174° to 179° C. at 748.9 mm. |
| Ethylene glycol crotonate | 110° to 114° C. at 1.5 mm. |
| Allyl crotonate | 153° to 159° C. at 748.9 mm. |

The following examples are illustrative of the production of the interpolymerization products of this invention. In all cases 0.5 part benzoyl peroxide was incorporated into the crotonic ester, which thereafter was mixed and copolymerized with an unsaturated alkyd resin, specifically diethylene glycol maleate, by heating at 80° C. for varying periods of time.

EXAMPLE 2

| | Parts |
|---|---|
| Ethyl crotonate | 10 |
| Diethylene glycol maleate | 90 | yielded a hard, tough interpolymer after 2 hours' heating at 80° C. Products of similar characteristics also were obtained when butyl crotonate and ethylene glycol crotonate were substituted for ethyl crotonate in the above formula, the time and temperature of copolymerization being the same in all cases.

EXAMPLE 3

| | Parts |
|---|---|
| Ethyl crotonate | 90 |
| Diethylene glycol maleate | 10 | containing 0.5 part benzoyl peroxide yielded a viscous liquid interpolymerization product when heated for 48 hours at 80° C.

EXAMPLE 4

| | Parts |
|---|---|
| Ethylene glycol crotonate | 90 |
| Diethylene glycol maleate | 10 | when copolymerized in the presence of 0.5 part benzoyl peroxide gave a mobile gel after 3½ hours' heating at 80° C. After 28 and 48 hours of further heating at this temperature the copolymer resembled edible hydrated gelatine.

EXAMPLE 5

| | Parts |
|---|---|
| Allyl crotonate | 10 |
| Diethylene glycol maleate | 90 | yielded a hard, tough, insoluble and infusible interpolymer when copolymerized for 2 hours at 80° C. in the presence of 0.5 part benzoyl peroxide. When the proportions of allyl crotonate and diethylene glycol maleate were reversed, a white, opaque, non-flowing gel was obtained after 24 hours' heating at 80° C. and a fairly hard gel with rubbery characteristics after heating for 144 hours.

EXAMPLE 6

| | Parts |
|---|---|
| Glyceryl crotonate | 10 |
| Diethylene glycol maleate | 90 | gave a hard, tough, insoluble and infusible copolymer when interpolymerized for 2 hours at 80° C. However, when the ratios of glyceryl crotonate and diethylene glycol maleate were reversed, the copolymer which resulted after 144 hours' heating at 80° C. was a soft gel.

It will be understood, of course, that my invention is not limited to interpolymerization products of diethylene glycol maleate and the specific esters of crotonic acid mentioned in the above illustrative examples, and that instead of these particular crotonic esters I may use any other ester of crotonic acid, for example methyl crotonate, propyl crotonate, isopropyl crotonate, amyl crotonate, methallyl crotonate, crotyl crotonate, 1-chlorallyl crotonate, 2-chlorallyl crotonate, cinnamyl crotonate, vinyl crotonate, methvinyl crotonate, phenyl crotonate, furfuryl crotonate, etc. Likewise, instead of using diethylene glycol maleate I may use any other polymerizable unsaturated alkyd resin, for example the esterification products of Diethylene glycol (106 parts) and itaconic acid (130 parts)
Glycerine (18.4 parts) and itaconic acid (39 parts)
Thiodiglycol (24 parts) and itaconic acid (26 parts)
Ethylene glycol (62.05 parts), itaconic acid (32.51 parts) and phthalic anhydride (111.03 parts)
Glycerine (20 parts), itaconic acid (29 parts) and phthalic anhydride (11 parts)
Diethylene glycol (20 parts), itaconic acid (18.2 parts) and succinic acid (7.08 parts)
Diethylene glycol (30.6 parts), maleic anhydride (17.6 parts) and itaconic acid (15.6 parts)
Ethylene glycol (20 parts), maleic anhydride (29.4 parts) and succinic acid (3.3 parts)
Glycerine (18.4 parts) and maleic anhydride (29.4 parts)
Diethylene glycol (30.3 parts), maleic anhydride (13.2 parts) and phthalic anhydride (21.7 parts)
Glycerine (25.76 parts), maleic anhydride (13.72 parts) and phthalic anhydride (20.72 parts)
Ethylene glycol (18 parts) and maleic anhydride (27.4 parts)
Ethylene glycol (23 parts) and itaconic acid (52 parts) etc.

Also, polymerization catalysts other than benzoyl peroxide may be employed, for instance accelerators of polymerization such as hereinbefore mentioned.

In certain cases, instead of copolymerizing a single ester of crotonic acid with a single unsaturated alkyd resin, I may copolymerize a plurality of such esters either with a single unsaturated alkyd resin or with a plurality of such resins. In this way it is possible to obtain a composition comprising a mixture of interpolymers best adapted to meet a particular service application.

In other cases, for example where it is desired further to raise the softening point, to decrease the solubility, or to produce insoluble, infusible or insoluble and infusible products, this may be done by replacing a part of the crotonic ester or a part of the unsaturated alkyd resin, or of both, in the above formulas with another organic compound or compounds having the grouping

This

containing compound is usually one which is readily polymerizable alone, although it need not be; the only requirement is that it be copolymerizable with the other components. For instance, the crotonic ester or the unsaturated alkyd resin, or both, may be replaced in part by substances such, for instance, as diallyl itaconate, diallyl oxalate, diallyl phthalate, diallyl glutarate, diallyl carbonate, diallyl malonate, diallyl adipate, diallyl pimelate, diallyl suberate, diallyl sebacate, diallyl alpha dimethyl malonate, diallyl alpha allyl malonate, diallyl maleate, diallyl fumarate, diallyl mesaconate, diallyl citraconate, diallyl tartrate, diallyl citrate, triallyl carballylate, diallyl glutaconate, diallyl hydromucate, diallyl glutinate, tetra-allyl symmetrical ethane tetracarboxylate, etc.; by polyhydric alcohol and unsaturated alcohol esters of acrylic and methacrylic acids, e. g., glycol (ethylene glycol) acrylate, glycol dimethacrylate, allyl methacrylate, methallyl acrylate, methallyl methacrylate, etc.; or by mixtures of such substances. Illustrative examples of other

containing compounds which may be incorporated into the interpolymers of this invention are given in various copending applications of mine, for example in Serial Nos. 294,493, 294,494, 294,495, 294,496 and 294,497, filed September 12, 1939; Serial Nos. 302,167, 302,168, 302,169, 302,171, 302,172, 302,173 and 302,174, filed October 31, 1939; Serial No. 304,783, filed November 16, 1939; Serial Nos. 307,144 and 307,147, filed December 1, 1939; and Serial No. 313,103, filed January 9, 1940, all of these copending applications being assigned to the same assignee as the present invention.

Although in the foregoing examples I have shown interpolymers of from 10 to 90 per cent by weight of an unsaturated alkyd resin with from 90 to 10 per cent by weight of an ester of crotonic acid, it will be understood of course that the invention is not limited to these particular proportions of components. Thus, in the production of organic plastic masses or coating compositions for certain particular applications, or with certain unsaturated alkyd resins, the unsaturated alkyd resin may constitute as much as 98 or 99 per cent by weight of the whole. In such cases the crotonic ester usually serves mainly as an internal plasticizer of the unsaturated alkyd resin. In general, the proportions will be varied depending upon the particular properties desired in the interpolymer. For most applications I prefer to use from 10 to 50 per cent by weight ester of crotonic acid to from 90 to 50 per cent by weight unsaturated alkyd resin, since within these ranges of proportions hard, tough interpolymers best adapted for most commercial applications can be produced.

The interpolymerization products of this invention have a wide range of properties. Depending, for example, upon the particular crotonic ester and the particular unsaturated alkyd resin employed, the particular proportions thereof, the conditions of polymerization (temperature, time, pressure, presence or absence of catalyst, kind of catalyst used, if any, as well as the catalyst concentration, etc.) and the extent of the interpolymerization, they vary from soft, flexible, soluble bodies to hard, rigid masses of varying resistance to solvents. In intermediate stages of copolymerization some form fluid compositions of varying intrinsic viscosities and may be so used. For coating or impregnating applications where the presence of a small amount of solvent in the cured composition is not objectionable, the mixed starting components may be diluted with volatile or non-volatile solvents to viscosities best suited for the particular service application, and then may be copolymerized after the application of the solution to the particular article to be coated or coated and impregnated. By suitable selection of the starting materials and the conditions of interpolymerization, interpolymers can be obtained in an insoluble, infusible state practically resistant to the destructive effect of other chemical bodies such as acids, bases, solvents and the like.

These new compositions may be used alone or with fillers, dyes, pigments, opacifiers, lubricants, plasticizers, natural and synthetic resins or other modifying bodies in, for example, casting, molding and laminating applications, and as adhesives, impregnants and surface coating materials.

In coating, impregnating and similar applications the mixed monomeric or partly copolymerized materials, without added solvent, may be applied to the object to be treated and polymerized as hereinbefore described, with or without the application of pressure, to form the copolymer in situ. These new synthetic materials may be used as impregnants for many porous bodies, such as cork, pottery, felts, or fabricated bodies with interstices, such as the windings of electrical coils, netted fibers, interwoven fibrous materials, etc. They also may be used in the production of wire enamels and winding tapes, and for protectively coating impervious articles such as metals, or for coating or coating and impregnating articles such as paper, wood, cloth, glass fibers in felted, woven or other form, concrete, linoleum, synthetic boards, etc. These new synthetic bodies also may be employed in making laminated fibrous sheet materials wherein superimposed layers of cloth, paper, etc., are firmly bonded together with the synthetic body.

The mixed monomers or partial polymers, with or without modifying agents, may be cast and molded under heat or under heat and pressure. The solid thermoplastic and thermosetting bodies of this invention also may be molded by injection, extrusion or compression molding technique whereby they are converted (heat- and pressure-hardened in the case of thermosetting bodies) into a variety of molded articles for industrial, household and novelty uses.

What I claim as new and desire to secure by Letters Patent of the United States is:

1. A polymerizable composition comprising allyl crotonate and at least one unsaturated alkyd resin.

2. As a new product, an interpolymer obtained by polymerization of a mixture containing as essential components allyl crotonate and an unsaturated alkyd resin.

3. A composition comprising an interpolymer of ingredients comprising, by weight, from 10 to 90 per cent of allyl crotonate and from 90 to 10 per cent of an unsaturated alkyd resin.

4. A composition comprising an interpolymer produced by polymerization of a mixture comprising an unsaturated alkyd resin obtained by esterifying a dihydric alcohol with an alpha unsaturated alpha beta dicarboxylic acid and, in addition to said resin, allyl crotonate.

5. A composition comprising the product of polymerization of a mixture comprising allyl crotonate and diethylene glycol maleate.

6. The product of polymerization of a mixture comprising, by weight, from 10 to 50 per cent of allyl crotonate and from 50 to 90 per cent of diethylene glycol maleate.

7. A hard, tough, insoluble and infusible product of polymerization of a mixture of allyl crotonate and diethylene glycol maleate in the ratio of, by weight, 10 parts of the former to 90 parts of the latter.

8. A composition comprising the product of polymerization of a mixture comprising allyl crotonate and a polymerizable esterification product of diethylene glycol, maleic anhydride and phthalic anhydride.

9. A composition comprising an interpolymer obtained by polymerization of a mixture comprising allyl crotonate and a polymerizable esterification product of a polyhydric alcohol, an alpha unsaturated alpha beta polycarboxylic acid and a polycarboxylic acid selected from the class consisting of saturated aliphatic polycarboxylic acids and aromatic polycarboxylic acids.

10. A molding composition adapted to be hardened under heat, said composition comprising, by weight, from 10 to 50 percent of allyl crotonate and from 50 to 90 per cent of an unsaturated alkyd resin.

11. A molded article of manufacture comprising the heat-hardened molding composition of claim 10.

12. The method of producing new compositions especially adapted for molding, coating and adhesive applications which comprises mixing allyl crotonate with a least one unsaturated alkyd resin and treating the resulting mixture to effect copolymerization between the said components.

GAETANO F. D'ALELIO.